Figure 1:
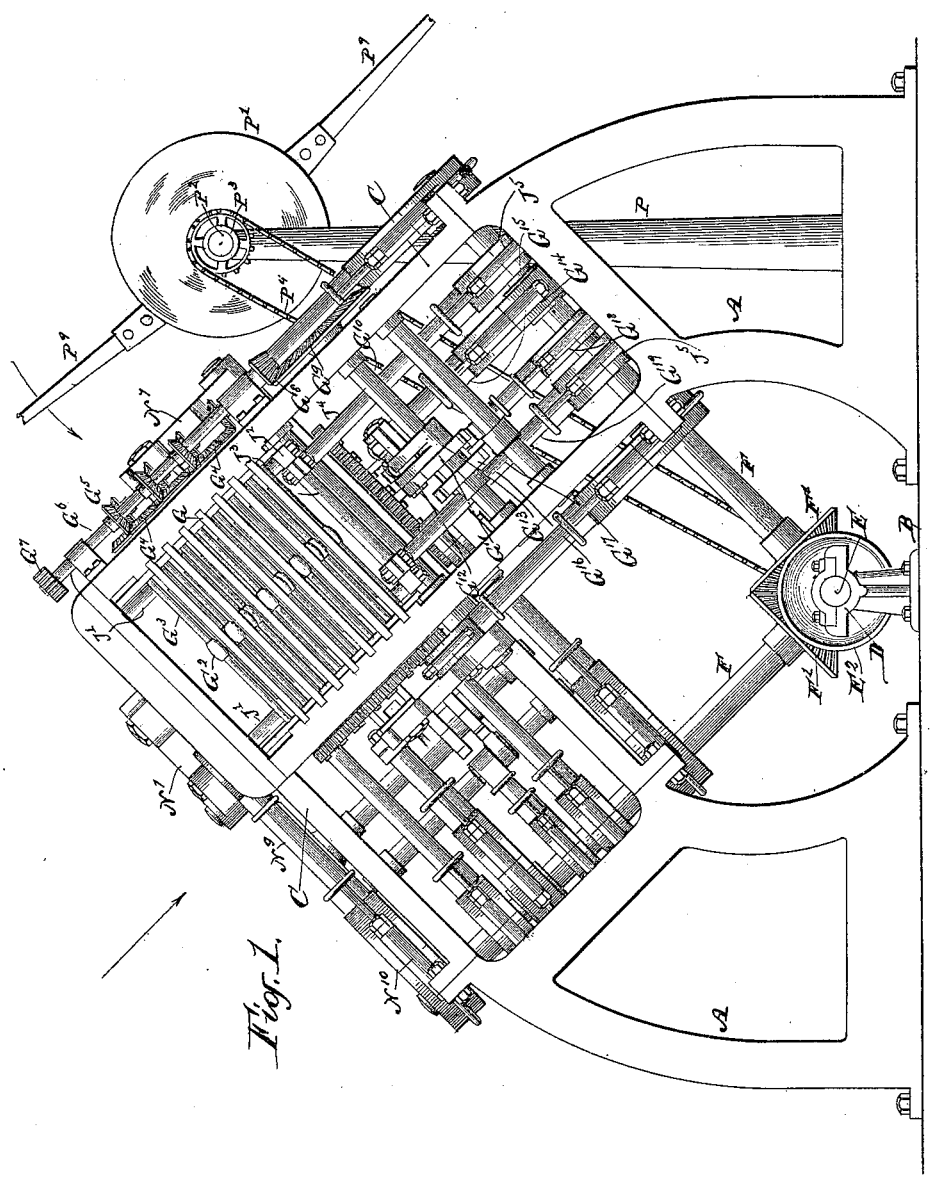

No. 658,930. Patented Oct. 2, 1900.
J. STARMAN.
CELL CASE MACHINE.
(Application filed June 21, 1900.)
(No Model.) 9 Sheets—Sheet 1.

Witnesses. Inventor.
Chas L. Hibbard Joseph Starman,
Frank A Thomas By J. M. St. John,
Atty.

No. 658,930. Patented Oct. 2, 1900.
J. STARMAN.
CELL CASE MACHINE.
(Application filed June 21, 1900.)
(No Model.) 9 Sheets—Sheet 2.

No. 658,930. Patented Oct. 2, 1900.
J. STARMAN.
CELL CASE MACHINE.
(Application filed June 21, 1900.)
(No Model.) 9 Sheets—Sheet 3.

Witnesses
Chas. L. Hibbard
Frank A. Thomas

Inventor
Joseph Starman
By J. M. St. John
Atty.

No. 658,930. Patented Oct. 2, 1900.
J. STARMAN.
CELL CASE MACHINE.
(Application filed June 21, 1900.)
(No Model.) 9 Sheets—Sheet 4.
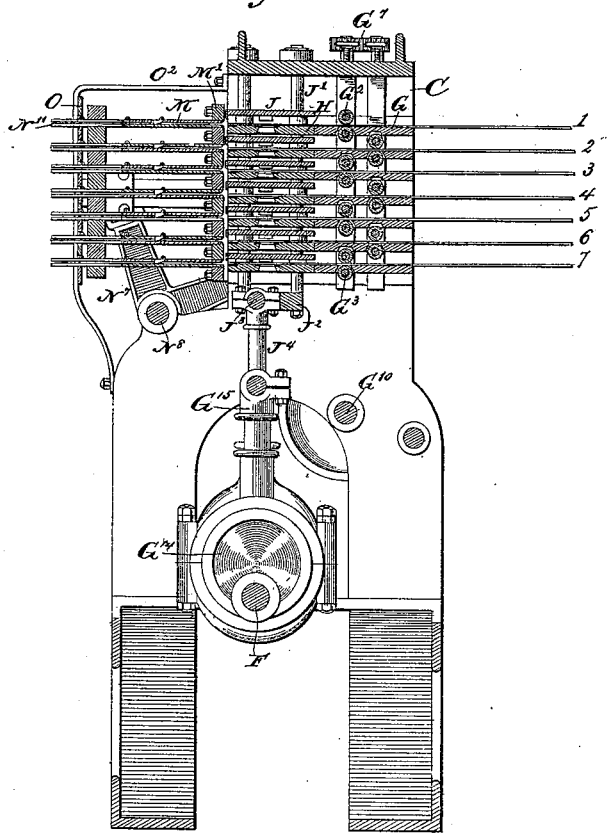
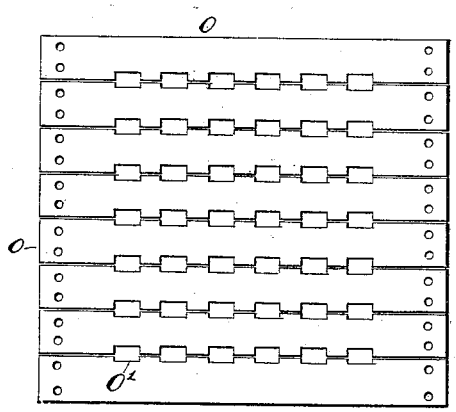
Witnesses.
Chas. L. Hibbard
Frank A. Thomas
Inventor
Joseph Starman,
By J. M. St. John
Atty.
THE NORRIS PETERS CO., PHOTO-LITHO., WASHINGTON, D. C.

No. 658,930. Patented Oct. 2, 1900.
J. STARMAN.
CELL CASE MACHINE.
(Application filed June 21, 1900.)

(No Model.) 9 Sheets—Sheet 6.

No. 658,930. Patented Oct. 2, 1900.
J. STARMAN.
CELL CASE MACHINE.
(Application filed June 21, 1900.)
(No Model.) 9 Sheets—Sheet 7.
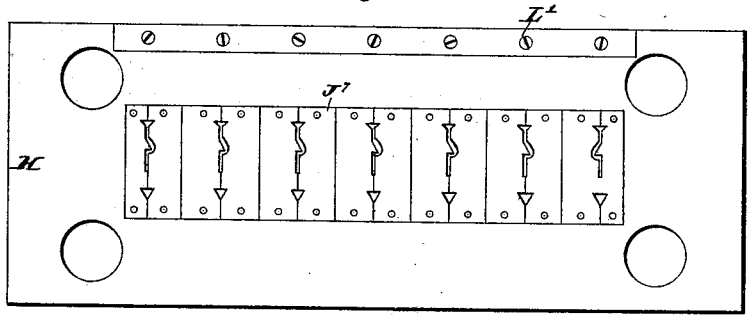
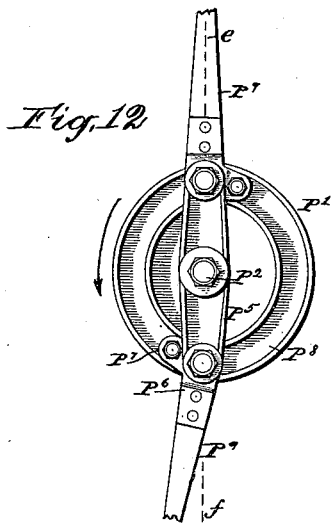
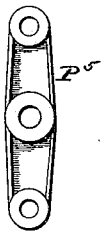
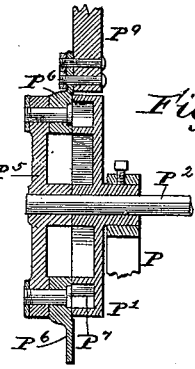
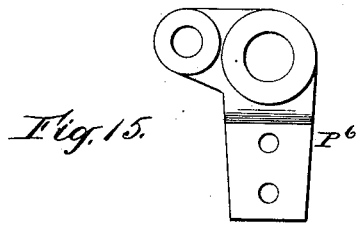
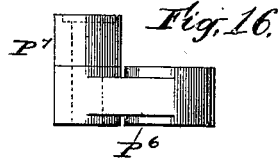
Witnesses.
Chas L. Hibbard
Frank A. Thomas
Inventor
Joseph Starman
By J. M. St. John
Atty.
THE NORRIS PETERS CO., PHOTO-LITHO., WASHINGTON, D. C.

No. 658,930. Patented Oct. 2, 1900.
J. STARMAN.
CELL CASE MACHINE.
(Application filed June 21, 1900.)

(No Model.) 9 Sheets—Sheet 8.

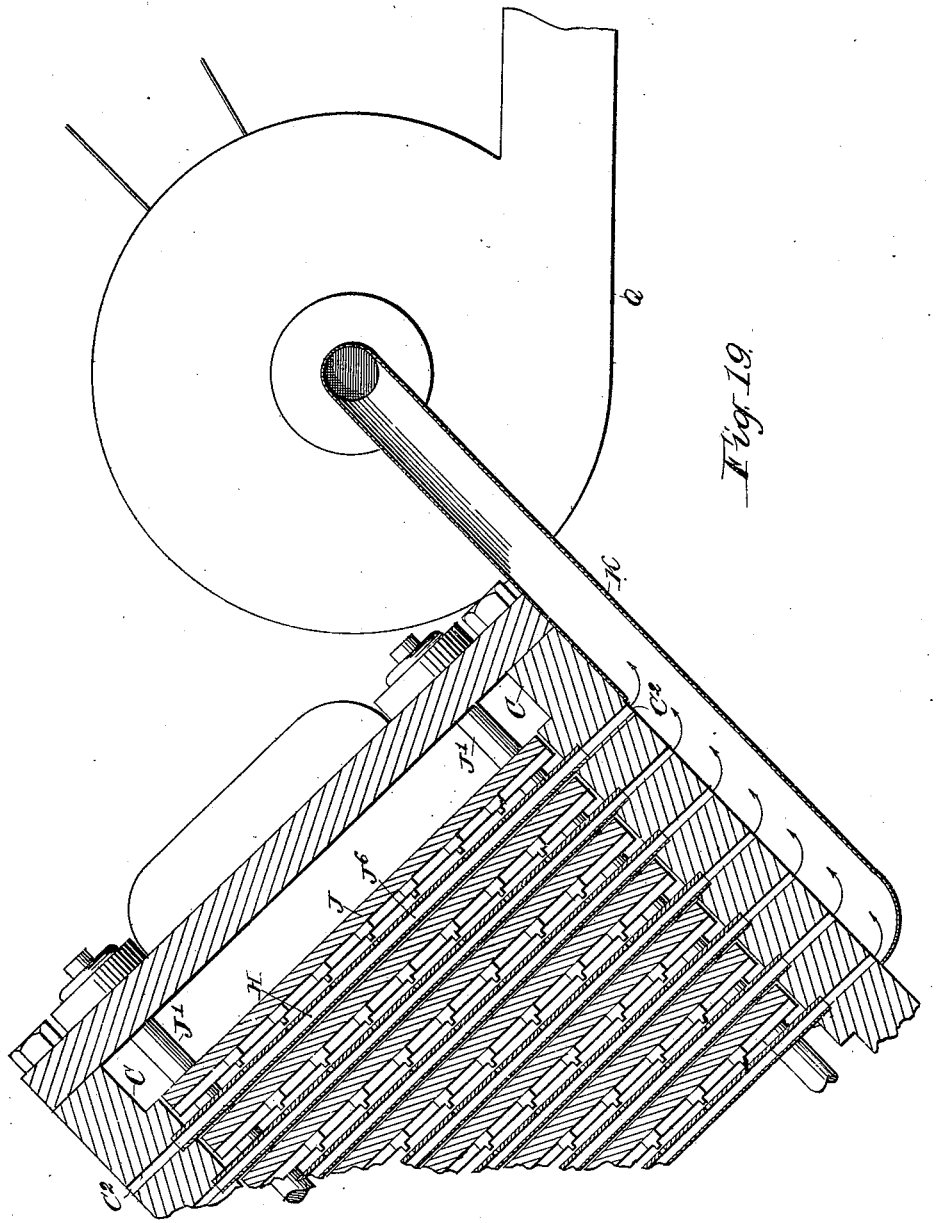

UNITED STATES PATENT OFFICE.

JOSEPH STARMAN, OF CEDAR RAPIDS, IOWA.

CELL-CASE MACHINE.

SPECIFICATION forming part of Letters Patent No. 658,930, dated October 2, 1900.

Application filed June 21, 1900. Serial No. 21,127. (No model.)

*To all whom it may concern:*

Be it known that I, JOSEPH STARMAN, a citizen of the United States, residing at Cedar Rapids, in the county of Linn and State of Iowa, have invented certain new and useful Improvements in Cell-Case Machines; and I do hereby declare the following to be a full, clear, and exact description of the invention, such as will enable others skilled in the art to which it appertains to make and use the same.

This invention relates to automatic machines for the manufacture of completed cell-cases or "fillers" used in the transportation of eggs. In the main the machine which is the subject of this invention embodies some of the characteristic features of the machine described in Letters Patent of John T. Carmody, No. 644,762, on the 6th day of March, 1900, to which reference may be had.
It is the object of my invention, however, through improvements which will be fully hereinafter described to greatly increase the productive capacity and efficiency of this type of machine with but little increase, or possibly a decrease, in the cost of building and erecting such a machine.

The nature of the invention and the construction and operation of a machine embodying it will clearly appear from the description and claims following, reference being had to the accompanying drawings, forming a part of this specification.

Figure 2:
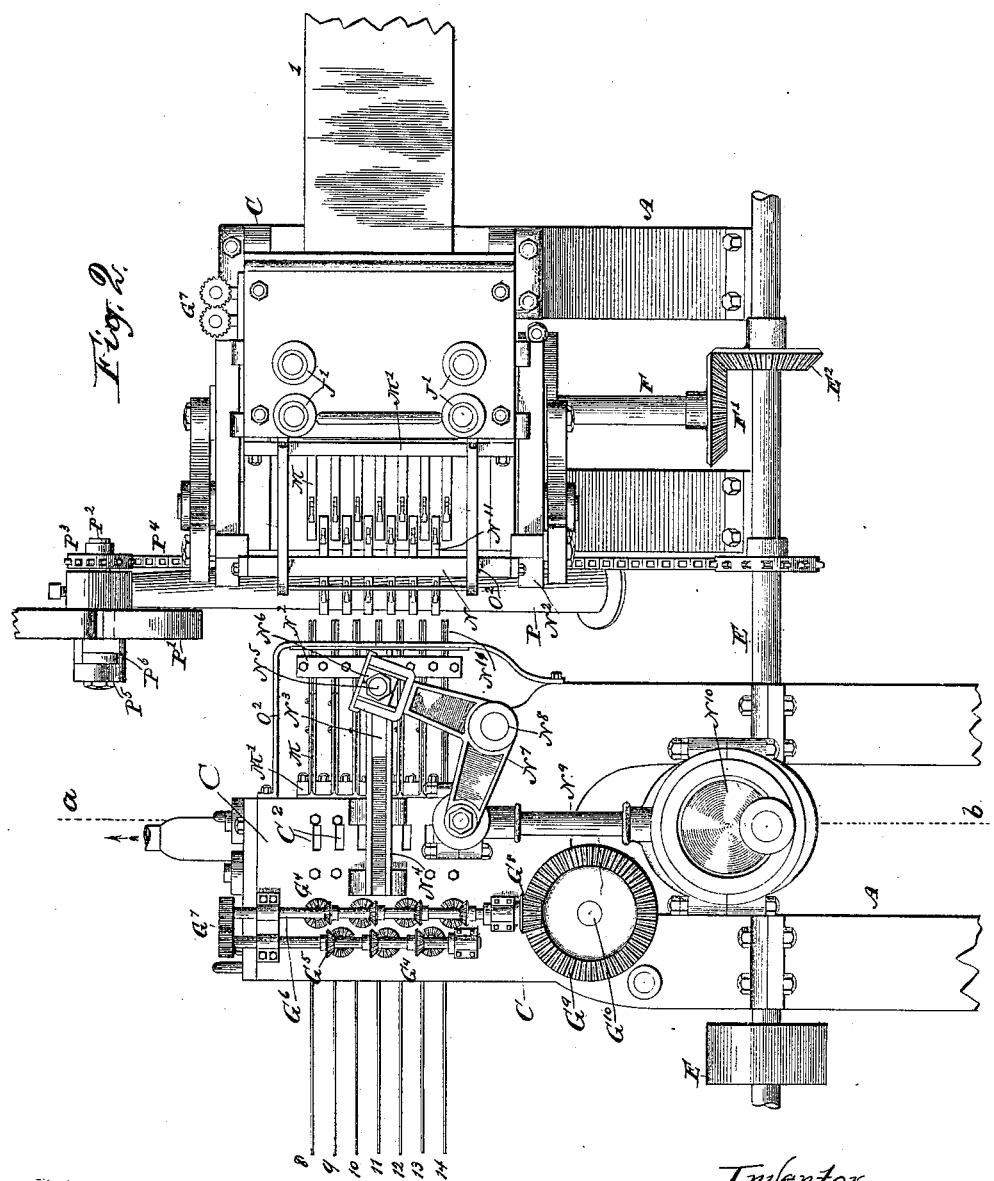
Figure 3:
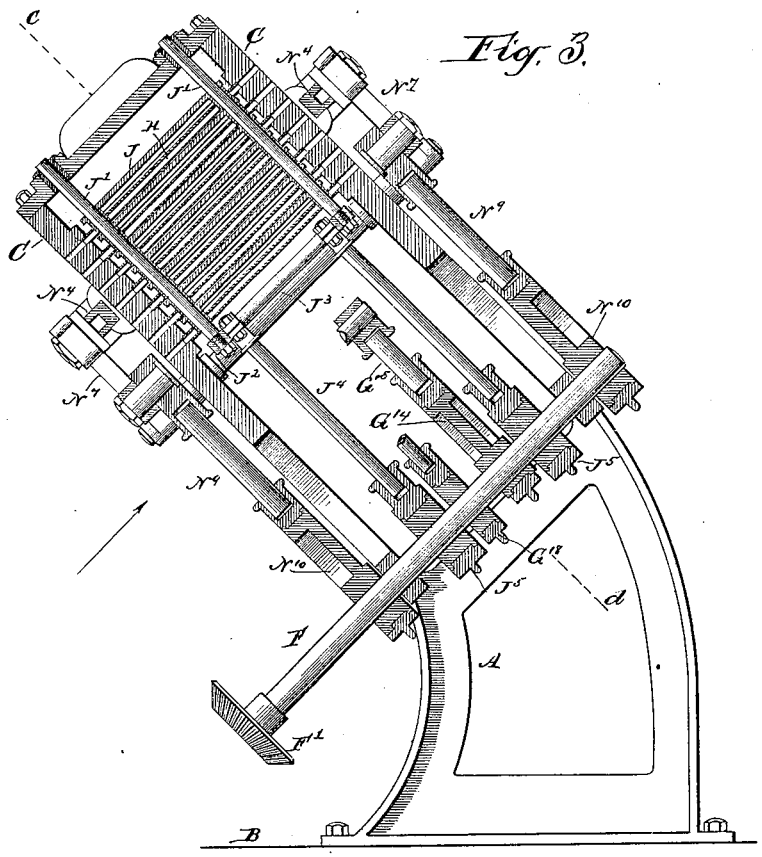
Figure 4:
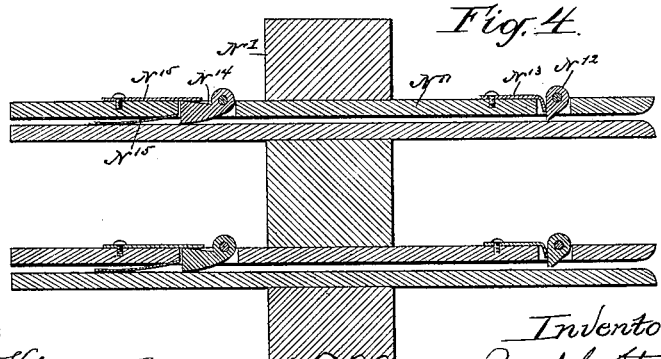
Figure 7:
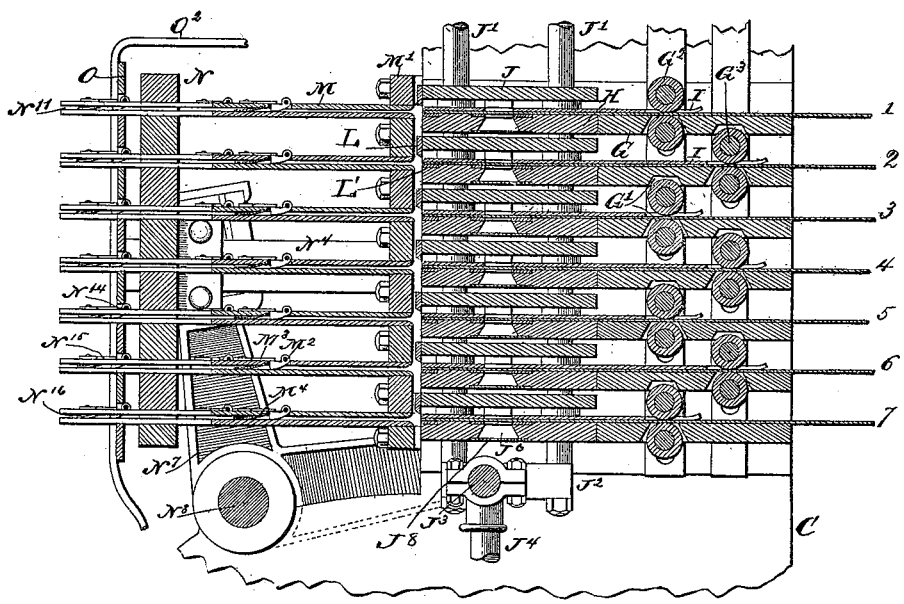
Figure 8:
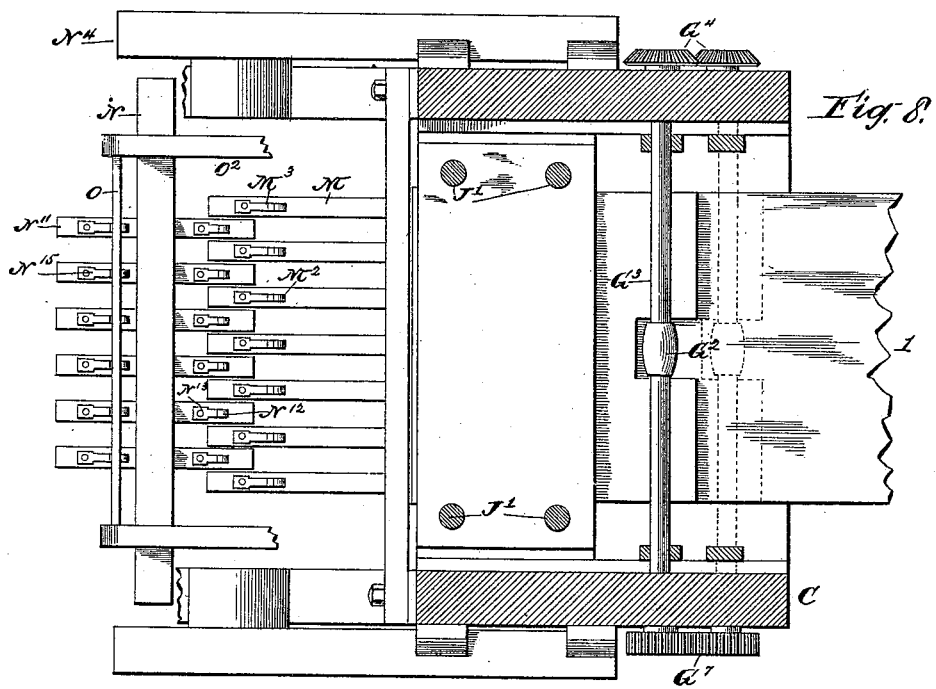
Figure 9:
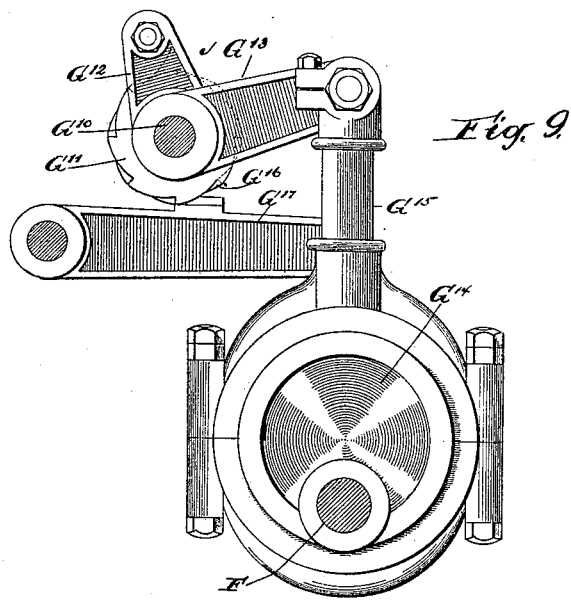
Figure 10:
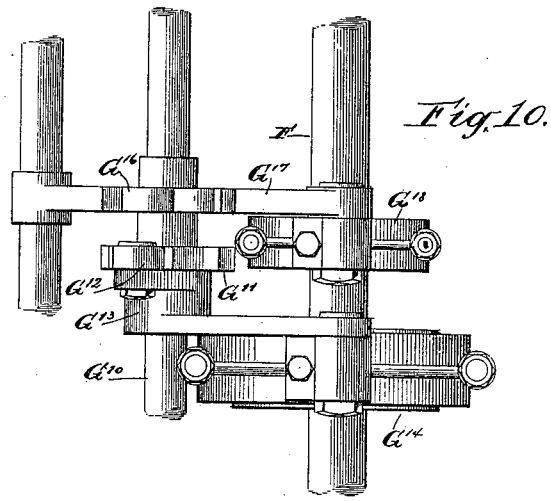
Figure 17:
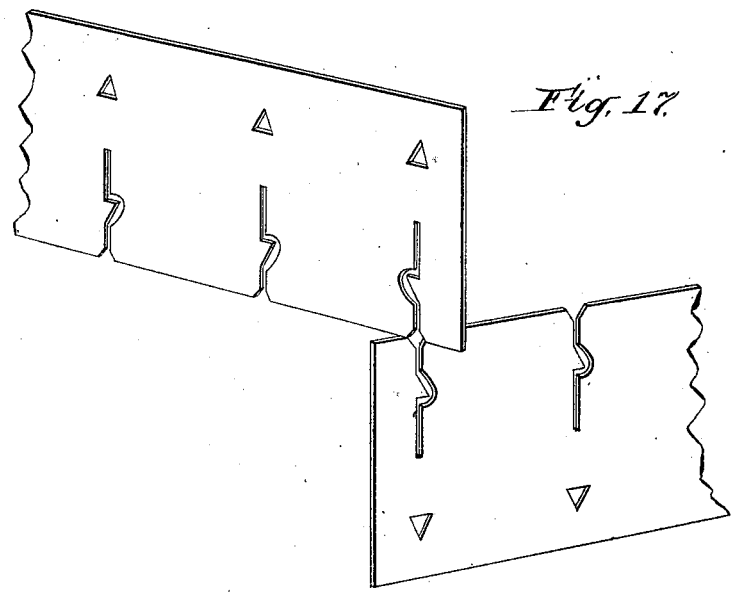
Figure 18:
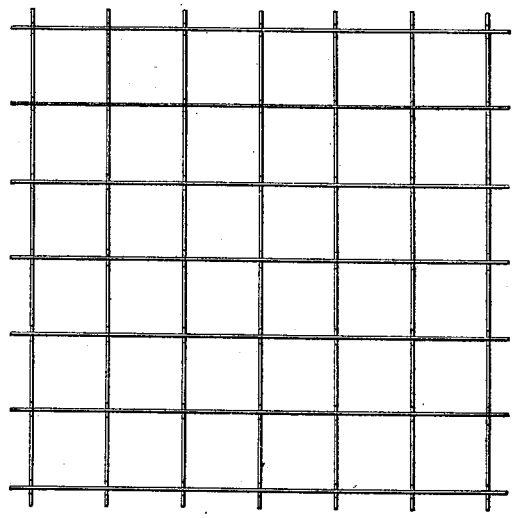

Of the drawings, Figure 1 is an end view of the machine, but without the reels which support the rolls of strawboard out of which the cell-cases are made. Fig. 2, Sheet 2, is a view of the main parts of the machine, looking in the direction indicated by the arrow in Fig. 1. Fig. 3, Sheet 3, is a section in the line $a\ b$ of Fig. 2, looking to the right, the half of the machine at the extreme right being omitted. Fig. 4 is a longitudinal section of a pair of the guides for the strips of which the cell-case is composed. Fig. 5, Sheet 4, is a section in the line $c\ d$ of Fig. 3, looking in the direction indicated by the arrow. Fig. 6 is a face view of the cell-case stripper. Fig. 7, Sheet 5, is a longitudinal section through the feed-rolls, cutting mechanism, and strip-carrying mechanism. Fig. 8 is a top view of the same parts. Fig. 9, Sheet 6, is a side view of the actuating mechanism for the feed and automatic stop. Fig. 10 is a top view of the same. Fig. 11, Sheet 7, is a top view of a die-plate and dies. Fig. 12 is a side view of the ejector mechanism. Fig. 13 is the yoke therefor. Fig. 14 is a section in the line $e\ f$ of Fig. 12, looking toward the left. Fig. 15 is a side view of the arm to which the ejector-sweep is attached. Fig. 16 is a top view of the same. Fig. 17, Sheet 8, is a fragmentary view in perspective of two filler-strips in position to interlock. Fig. 18 is a plan view of a completed cell-case or filler. Fig. 19 is an ideal section illustrating means for discharging the chips and dust from under the punches and dies.

Like reference characters denote corresponding parts in all the views.

In common with the machine to which reference has above been made this machine is designed to use as many sheets of strawboard as there are strips in the finished cell-case. In the egg-case fillers of commerce fourteen strips are used, one half of them interlocking with the other half. It will be understood, then, that seven such sheets are conducted into each half of this machine from rolls of strawboard mounted on a suitable reel, which it has not been thought necessary to illustrate. The machine itself, as will be seen, is composed of two similar structures set in opposite position and separated by a distance slightly greater than the depth of the cell-case where the same is finally ejected. The mechanism is so arranged that the sheets in their progress through the machine incline laterally at an angle of about forty-five degrees, the two sets thus meeting perpendicular to each other and in position to be easily interlocked.

Referring now to the drawings, A A designate sector-shaped frames secured to a suitable base B. From the angled upper ends of these frames extend rectangular frames C, supporting and containing nearly all of the operative mechanism. In suitable bearings D is mounted the main driving-shaft E, provided with a driving-pulley E' and miter-gears E², meshing with similar gears F' on inclined shafts F, suitably journaled in the main frames. To these shafts are secured a series of eccentrics, by means of which all the operations of the machine excepting the ejection of the cell-case are effected.

The cycle of operations is as follows: The strawboard sheets are first fed forward a space corresponding to the width of the strip in the finished cell-case. They are next slotted by means of suitable punches and dies. A shear in advance of the dies then severs each strip across the line of the slots. A reciprocating strip-carrier then advances the strips formed in each half of the machine and finally interlocks them. They are then released and a swinging arm ejects them from the machine. This order of operations will be followed as far as practicable in the description of the mechanism.

Across the upper part of the machine-frame C extend a series of plates G and H at a uniform spacing corresponding to the space between the strips in the cell-case. The strawboard sheets, numbered consecutively from 1 to 14, inclusive, rest on the plane upper surfaces of these plates and are guided close thereto by a superimposed plate I. Through an opening $G'$ in each plate G projects a feed-roll $G^2$, forming one of a pair of such rolls, mounted on transverse shafts $G^3$. Owing to the narrowness of the space between the plates G this series of rolls is divided into two sets at each side of the machine and staggered, as shown. One end of one of each pair of shafts is provided with a miter-gear $G^4$, meshing with a corresponding gear $G^5$ on one of a pair of shafts $G^6$, perpendicular to the roll-shafts. These are connected by spur-gears $G^7$, and one of them is driven by a pinion $G^8$, engaging a gear $G^9$ on a transverse shaft $G^{10}$. Near the middle of this shaft is a ratchet $G^{11}$, actuated by a pawl $G^{12}$ on a bell-crank lever $G^{13}$, to which a reciprocating movement is imparted by an eccentric $G^{14}$ through the medium of a connecting-rod $G^{15}$. The eccentric, as will be seen, is mounted on the main cross-shaft E. By this simple construction separate ratchets for each pair of feed-rolls are dispensed with and a positive and simultaneous movement is given to all the rolls by a single ratchet, which may be as heavy and strong as the case may require. To prevent overfeed, a reversed ratchet $G^{16}$ is mounted near the other, and a stop-lever $G^{17}$, accurately adjusted and timed with reference to the stroke of the other ratchet, engages the stop-ratchet. The lever is actuated by an eccentric $G^{18}$ and its connecting-rod $G^{19}$.

The mounting of the die-plates H and of the punch-plate J is substantially similar to that described in the Carmody patent above referred to. It is to be noted, however, that I make use of four guide-rods $J'$ instead of two. This gives increased rigidity against lateral strains and also allows for openings through the frame at each side and in the plates under the dies which are central thereto, so that the chips and dust may be drawn out from under the dies through a dust-pipe K, communicating with an exhaust-fan Q of a familiar type, as shown in Fig. 19. The pairs of guide-rods at each end of the punch-plate are connected by a bridge $J^2$ and these bridges by a cross-shaft $J^3$, which couples by connecting-rods $J^4$ with a pair of eccentrics $J^5$ on the shaft F. The air-passage $J^6$ is in the form of a channel the whole length of the die-plate, with coinciding openings $C^2$ in the adjacent frame. Over the channel in the plate is the series of dies $J^7$ and below it is a thin plate $J^8$, making it practically airtight below. By this means all the punchings, dust, and dirt are drawn out of the machine, and it is made impossible for any of it to fall from one die to another and obstruct the operation of the machine.

The slotted strip is severed from the parent stock by a shear L at the edge of the punch-plate coacting with a straight-edged die $L'$ at the edge of the die-plate.

Before the strips are cut off they are fed between parallel strip-holding fingers M, secured to transverse bars $M'$, bolted to the machine-frame C. The inner ends of each pair of fingers are suitably rounded to give easy access to the edge of the strawboard. To each pair of fingers is pivoted a small detent $M^2$, controlled by a spring $M^3$. A light tension-spring $M^4$ is also provided to hold the strip snugly down on the lower finger of each pair.

A strip-carrier coöperates with the strip-holder and serves to transfer the strip from the place where it is cut off to its final position, interlocking with the corresponding strip from the opposite side of the machine. This strip-carrier is described as follows: N is a cross-head comprising a series of cross-bars $N'$, secured to a header $N^2$ at each end. Connected with each header is a slide-block $N^3$, mounted in a guide $N^4$, secured to the machine-frame C and parallel with the fingers of the strip-holder above described. To a stud or wrist $N^5$, projecting from the cross-head, is connected by a slide-block $N^6$ a bell-crank lever $N^7$, pivoted to the main frame at $N^8$. The other arm of the bell-crank couples by a connecting-rod $N^9$ to an eccentric $N^{10}$, the parts being duplicated at each side and in each half of the machine. Between the cross-bars of the cross-head are mounted a series of fingers $N^{11}$ in pairs corresponding to those of the strip-holders. They are arranged in the same inclined planes also but lateral to the fingers of the strip-holders, as shown in Fig. 8. It is to be understood also that the openings between these cross-bars and adjacent to the fingers are large enough to allow the fingers of the strip-holder to pass freely through. Near the end of each pair of fingers pointing toward the strip-holder is pivoted a dog or detent $N^{12}$, held normally in a position to grip the paper by a spring $N^{13}$. Toward the other end of each pair is a detent $N^{14}$, controlled by a spring N¹⁵ and a tension-spring N¹⁶ to prevent accidental movement of the strip. The action of this part of the machine will now be understood. The cross-head, with its series of carrying-fingers, is given a reciprocating movement for a distance considerably greater than the width of the strips. (In practice the stroke is six inches, while the width of the strips is two and one-fourth inches.) As it moves back toward the strip-holder the fingers straddle the still unsevered strip and the detent N¹² of each pair grips the strip at a point midway between the slots punched in it and about midway of its width. The strip is now cut off, and on the return stroke of the cross-head the strip is advanced six inches, a short distance beyond the detents M², which hold it from moving back. At the next back stroke of the cross-head the fingers of the strip-carrier slide over this strip, which thus passes the detents N¹⁴, which drop behind its back edge. At the succeeding return stroke the cross-heads at each side of the machine carry the strip to its final position, the whole series being interlocked. It is to be understood that at the outstroke the fingers of the strip-carriers of the respective halves of the machine overlap practically the whole width of the strip, and consequently the strips are all held straight and flat until forced into an interlocked position.

To hold the completed cell-case in proper position while the carrier-fingers are drawing back off it, a stripper is provided for each half of the machine, the faces of the two being separated but little more than the width of the filler-strips. The stripper is composed of a series of flat bars O, notched at O' to allow the fingers of the carrier to pass through and separated a little to allow the strip to pass between the bars. These bars are secured to brackets O², bolted to the machine-frames. The bars of opposite strippers of course stand at right angles to each other, and consequently when the filler is interlocked half of its strips are crosswise of the bars of each stripper. This prevents the completed filler or cell-case from being twisted or torn as the carrier-fingers are disengaged from it.

It is desirable to forcibly eject the finished cell-case rather than to depend on its own gravity to remove it out of the way of the next succeeding one. This is accomplished by a double-armed sweep revolving at one-half the speed of the main shaft and timed to strike the finished cell-case just after the carrier-fingers are withdrawn from it. The sweep-arms, furthermore, are given an irregular movement, so as to push the cell-case away from the ejector, as well as downwardly, and prevent any clinging of the cell-case to the sweep-arms as they revolve. On a suitable support—as, for example, the column P—is mounted a cam P' in a fixed position. Through the hub of the cam projects a shaft P², revolved in some suitable way, as by a sprocket P³ and chain P⁴, leading to a smaller sprocket on the main shaft. (Not shown.) To the other end of the shaft P² is secured a yoke P⁵, and to each end of it is pivoted a bell-crank arm P⁶, provided with a traveler $p^7$ to run in the cam-race P⁸. To the other arm of each bell-crank is secured a wooden sweep P⁹. The action of the ejector is illustrated in Fig. 12. As it revolves in the direction indicated by the arrow the descending sweep is deflected backwardly from the radial line, and as it comes in contact with the cell-case the latter is pushed diagonally from its position. The action is also illustrated in Fig. 1, the cell-case being swept out of the machine in the general direction indicated by the arrow near the sweep. As the sweep passes downwardly it naturally draws back and off the cell-case, and finally on the upstroke takes a radial position.

It is to be noted that all the operations of the machine in making and interlocking the filler are performed without the use of a cam, a full half-revolution being allowed for each of the successive operations—feeding the sheet, punching, feeding to cutting position, cutting, advancing the cut-strip half-way, and finally interlocking. This construction and arrangement to give ample time for each operation admits of the machine being run at a high rate of speed, with a corresponding increase in output.

Having thus described my invention, I claim—

1. In a machine of the class specified, the combination of feeding, punching and cutting mechanism, of a series of superimposed die-plates with dies attached thereto, provided with continuous channels below the dies to receive the chips and dust, a tight closure for the bottoms of said channels, and means for removing the contents thereof.

2. In a machine of the described class, the combination of a die-plate, dies secured thereto, a continuous channel through said die-plate from end to end below the dies, tightly closed at the bottom, and pneumatic means for removing the punchings from said channels.

3. In a machine of the class described, the combination of a die-plate having a continuous channel therethrough, practically central thereto, a plate closing the bottom of said channel, dies mounted over the same, and a pair of guide-rods passing through each end of the plate and at each side of said channel.

4. In a machine of the described class, the combination with feeding, punching and cutting mechanism, of a strip-holder having strip-receiving slots in line with the advance of the strip material, means for preventing the displacement of the strip in cutting off, and a reciprocating carrier adapted to engage the strip while so held and advance it in the same line until it interlocks with other strips intersecting its path.

5. In a machine of the described class, the combination with feeding, punching and cutting mechanism, of a strip-holder in line with the advance of the strip material, adapted to permit the advance and prevent the retrograde movement of the strip, said strip-holder being in a fixed position, and a reciprocating strip-carrier adapted to take the strips from the strip-holder and forward them to a position interlocking other intersecting strips.

6. In a machine of the described class, the combination with feeding, punching and cutting mechanism, of a strip-holder into which the strip is fed before cutting off, means for preventing any backward movement of the strip, while free to move forward, and a reciprocating strip-carrier coinciding and coacting with said holder, having also means for moving the strip forward and preventing backward movement, whereby the severed strip is positively moved to a position interlocking other intersecting strips.

7. In a cell-case machine, interlocking mechanism, comprising a fixed strip-holder into which the strip is thrust before cutting off, means for severing the strip from the main sheet, a detent in the strip-holder adapted to permit the advance and prevent the retreat of the strip, and a reciprocating strip-carrier adapted to receive the strip from the holder, grip it, and at one outstroke carry it past the holder-detent, a detent in the carrier to engage the strip at the succeeding instroke and positively push it forward through the holder and into engagement with intersecting strips, at a succeeding outstroke.

8. In a cell-case machine, a strip-holder comprising a series of parallel fingers arranged in pairs slightly separated to receive the strip, and adapted to allow the strip to move freely forward from end to end of the fingers, and detents in connection with said fingers to prevent retrograde movement of the strips.

9. In a cell-case machine, a reciprocating strip-carrier, comprising a series of parallel fingers arranged in pairs slightly separated to receive the strip, and adapted to allow the strip to move freely between them from end to end forwardly, a gripper in connection with said fingers to grip the strip while at rest, and a detent farther forward along said fingers to prevent retrograde movement of the strip as it is pushed forward through said fingers.

10. In a cell-case machine, strip-interlocking mechanism, comprising a strip-holder in a fixed position having a series of parallel fingers in pairs separated to receive the strip, and provided with means for preventing backward movement of the strip while allowing its free movement forward, and a similarly-constructed reciprocating strip-carrier, the fingers of which lie in the same planes as those of the strip-holder, and may move in and out in the lateral spaces between the respective pairs of holder-fingers, whereby the strip is alternately drawn forward by the carrier and held in its successively-advanced position by the strip-holder, substantially as described.

11. In a cell-case machine, a pair of oppositely-arranged machine-sections, each provided with feeding, punching and cutting mechanism arranged to operate on one-half of the strips in the finished cell-case, and in parallel planes which intersect those of the opposite machine-section, and each section provided with mechanism whereby the strip is received and held until cut off, then advanced in the same plane by one revolution of the machine a part of the way to their final position, and in a succeeding revolution thrust forward and interlocked with the corresponding series in the opposite machine-section.

12. In a cell-case machine, an ejector comprising a revolving sweep having a pivoted connection with its carrying-shaft, a cam, and an arm connecting with said sweep and provided with a cam traveler, whereby the arm is deflected from a radial position while ejecting the cell-case, and tends to push the same out diagonally, substantially as described.

13. In a cell-case machine, the described ejector, comprising a fixed cam, a shaft mounted to revolve therein, a yoke fixed to one of said shafts, bell-crank arm pivoted to said yoke, travelers on one arm of each bell-crank to follow the cam, and sweeps secured to the other arm of each bell-crank, with means for revolving the shaft and its connections.

In testimony whereof I affix my signature in presence of two witnesses.

JOSEPH STARMAN.

Witnesses:
 JOHN C. HEALD,
 M. H. BURTON.